(12) United States Patent
Krishnaswamy

(10) Patent No.: US 12,294,527 B2
(45) Date of Patent: May 6, 2025

(54) DYNAMIC MTU MANAGEMENT IN AN ENTERPRISE NETWORK

(71) Applicant: Celona, Inc., Campbell, CA (US)

(72) Inventor: Vijayaraghavan Krishnaswamy, Campbell, CA (US)

(73) Assignee: Celona, Inc., Campbell, CA (US)

( * ) Notice: Subject to any disclaimer, the term of this patent is extended or adjusted under 35 U.S.C. 154(b) by 168 days.

(21) Appl. No.: 17/985,478

(22) Filed: Nov. 11, 2022

(65) Prior Publication Data

US 2023/0155950 A1    May 18, 2023

Related U.S. Application Data

(60) Provisional application No. 63/279,010, filed on Nov. 12, 2021.

(51) Int. Cl.
*H04L 47/36*    (2022.01)

(52) U.S. Cl.
CPC ................................ *H04L 47/365* (2013.01)

(58) Field of Classification Search
None
See application file for complete search history.

(56) References Cited

U.S. PATENT DOCUMENTS

| | | | | |
|---|---|---|---|---|
| 10,638,363 | B2 * | 4/2020 | Gottwerth | H04L 67/52 |
| 10,674,422 | B2 * | 6/2020 | Cao | H04L 45/245 |
| 10,708,190 | B2 * | 7/2020 | Huang-Fu | H04W 28/12 |
| 10,841,834 | B2 * | 11/2020 | Gottwerth | H04W 28/0226 |
| 2019/0313285 | A1 * | 10/2019 | Gottwerth | H04W 28/065 |
| 2019/0387577 | A1 * | 12/2019 | Parron | H04L 47/2466 |
| 2021/0288901 | A1 * | 9/2021 | Cao | H04W 24/08 |

OTHER PUBLICATIONS

GSM, Technical Specification Group Services and System Aspects; GPRS enhancements for E-UTRAN access, clause 4.3.17.8 of TS 23.401 published by the 3rd Generation Partnership Project, v4.1, Apr. 2007, 41 pgs.
GSM, "Technical Specification Group Core 12 Network and Terminals; Mobile radio interface Layer 3 specification; ; Core network protocols; Stage 3", TS 24.008 published by the 3rd Generation Partnership Project, Dec. 2015, 460 pgs.

* cited by examiner

*Primary Examiner* — Ranodhi Serrao
(74) *Attorney, Agent, or Firm* — Jaquez Land Greenhaus & McFarland, LLP; Bruce W. Greenhaus

(57) ABSTRACT

Various embodiments of a method and apparatus are disclosed. A higher MTU (Maximum Transmit Unit) between a network Core and the eNBs of the network are configured, as well as in wireless RAN segments. These MTU are dynamically adjusted to allow for the most efficient the packet-sizes according to the UE capabilities and Radio-conditions.

20 Claims, 7 Drawing Sheets

DYNAMIC MTU MANAGEMENT IN AN ENTERPRISE NETWORK

BACKGROUND

(1) Technical Field

The disclosed method and apparatus relate generally to communication systems. In particular, the disclosed method and apparatus relates to a method and apparatus for efficient communication of information by selection of the amount of information to be included in transmitted packets.

(2) Background

Traffic between a core network and BS/AP (base station/access point) usually has a 1500-byte MTU (maximum transmission unit). A BS/AP is typically a WiFi access point or wireless telephone network base station, such as a 4G ($4^{th}$ generation cellular network) eNB (evolved NodeB) or 5G (5th generation cellular network) gNB (gNodeB). However, the data that passes through the various devices of the network adds many encapsulations to the data packet. Each such encapsulation reduces the end-user "application" throughput. That is, with each encapsulation, the payload size decreases due to the encapsulation of the header.

Enterprise networks are covered with cellular or Wi-Fi networks and are typically well-administered networks, unlike the Internet. The equipment used may be capable of supporting a higher MTU. The wireless RAN (Radio Access Network) packet transport capacity increases with the use of a higher modulation scheme, a higher MIMO (multi-in-multi-out) capability and carrier aggregation. Accordingly, use of such techniques allows the amount of data that can be communicated by the packets that conform to the MTU in the network to be increased, thus reducing the ratio of the overhead to the payload transmitted through the network. Increasing the MTU also reduces the size of the packets that can be transmitted, thus increasing the payload-to-overhead ratio. Accordingly, the system and all network elements can transmit user traffic more effectively. However, network packet losses and air link issues can reduce the throughput. In addition to making it necessary to retransmit packets, relatively small errors in a large packet will make it necessary to retransmit the entire large packet. Therefore, while it is more efficient to transmit large packets to increase the ratio of the payload to the overhead (i.e., headers), if such large packets have to be transmitted frequently, it is more efficient to send smaller packets that are less likely to have errors that require the packet to be retransmitted. In addition, since the packets are smaller, retransmission of those packets that are in error requires less of the network resources. That is, when large packets are being transmitted, valid data has to be retransmitted with the errant data within the large packets. In contrast, when smaller packets are being transmitted, typically, less valid data is retransmitted with the errant data.

In the case of the CBRS private networks operating in an LTE (Long Term Evolution 4G cellular network), eNBs and EPCs (Evolved Packet Cores) are typically deployed together to provide LTE cellular service for the enterprise customer devices. These devices can be regular mobiles/tablets, industry-specific devices like POS (Point of Service) units, cameras, sensors, controls, etc. Some of the devices are high-end devices and can support IPv4 (Internet Protocol, version 4) and IPV6 (Internet Protocol, version 6). These devices can support a wide variety of other features, like 4×4 MIMO and carrier-aggregation. In the future, devices will be able to support multiple RATs (Radio Access Transmissions), including 5G NR (New Radio) cellular networks.

In the operator networks, when the eNB and EPC are separated by the Internet, IPSec (internet protocol security) tunnels are typically deployed. In such cases, the packet sizes can get large due to different header encapsulations for GTP/IPSec (GPRS Tunneling Protocol/IPSec), etc., where GPRS is the acronym for General Packet Radio Service. The packet sizes can exceed the typical ethernet MTU of 1500. This results in a need to fragment and reassemble the packets that are too large to transmit the packets in the network. In general, this fragmentation and reassembly can cause significant transmission delays and reductions in the throughput of the system.

In TCP (Transmission Control Protocol) traffic, for example, the MSS (maximum segment size) may be clamped in the intermediate node to reset the MSS values to values that can assist with the problems created by the need to fragment packets. Such values might be 1280 bytes, etc. In this way, traffic does not suffer fragmentation and reassembly even after the addition of the GTP/IPSec headers, and the packets can be forwarded in the fast-path. However, every packet carries less than 1280 bytes, rather than carrying a payload of up to 1448 bytes. This is equivalent to >11% reduction in the Downlink application throughput.

On the RAN side, clamping the MSS results in an additional PDCP/RLC/MAC (Packet Data Convergence Protocol/Radio Link Control/Media Access Control) header for each packet. These headers add relatively few bytes. Therefore, the overhead is not significantly increased. On the wireless side, multiple IP-packets (Internet Protocol-packets) get concatenated into Transport-Blocks and carried to the UE where they are demultiplexed and sent to the UE TCP/IP stack after removal of the PDCP/RLC/MAC headers.

FIG. 1 is an illustration of a network in which the network uses 1500 byte MTU with appropriate reduction for GTP/IP overheads. To transport a 9000-byte payload, the system uses 6 packets of 1448 bytes+52-byte headers and an additional packet of 312 bytes+52-byte header.

Basic Operation with Normal MTUs

FIG. 3 is an illustration of a network 300 in which the static setting with normal 1500-byte MTU in both core and RAN. The following describes some aspects of the basic operation that occurs with the normal MTU size. In the network 300, the MTU of 1500 is used to establish packet-size transactions that avoid fragmentation/reassembly at the IPV4 level. Note that the numerical values are example numbers and can be different depending on the encapsulations, UE protocols and the core-network configuration that are used.

SUMMARY

Various embodiments of a method and apparatus are disclosed. In some embodiments, higher MTU between the Core-network and eNB (like up to 9000 bytes) are configured and also in a wireless RAN segment and dynamically adjust the packet sizes according to the UE capabilities and Radio-conditions.

It is possible to configure higher MTU mainly in private CBRS networks, as usually the elements are co-located and from the same vendor and enterprise networks are easier to reconfigure for higher MTU. Using higher packet sizes provides increased application throughput, lesser packet rates, lesser uplink acknowledgments, etc. Disadvantages include the fact that many parts of the network need to support any necessary retransmissions in which a full, large packet has to be retransmitted, wasting resources, especially on wireless networks. To take into account network packet losses and airline issues, the system is further enhanced to use a more dynamic method of packet-size/MTU setting on a per UE, per-flow and per-direction basis.

Initial Static Settings:
- Have the CBRS network (including traffic servers) configured with Higher MTU;
- Have the EPC configure the UE with higher MTU during PDN-session creation (on IPv4 and IPv6 bearers only); and
- Tune the EPC and eNB/gNB configurations to process big-size packets.

However, UE may not be capable of this higher MTU. So, initially, if there are any DL-packets to UE, EPC 'pre-fragments to low-MTU' and sends the traffic towards UE. UL-packets from UE are processed as-is. If the UE is capable of using Higher-MTU and the UE negotiates a TCP connection with High-MSS value, then EPC sends the "whole packets" as-is towards UE. UL-packets from UE are processed as-is.

UE Traffic Suffers TCP Retransmissions (Indicating Packet Loss in UE/Network):
- EPC detects this condition by deeply inspecting the UE TCP-flow's SACK packets (Selective Acknowledgment packets) and determining that TCP retransmissions are high above a threshold.
- EPC performs in steps a) pre-fragmentation to smaller packet sizes, b) performs MSS-clamping to reduce packet sizes for the next TCP sessions c) sets lower MTU values for any new PDN connections from the UE.
- EPC continues monitoring TCP-SACKs from UE TCP-flows and sees TCP-retransmissions have reduced below threshold.
- EPC performs reverse steps a) stops pre-fragmentation to lower-packet size, b) avoids MSS-clamping for the next TCP session) sets higher MTU values for any new PDN connections from the UE.

It is possible, that the TCP level retransmissions are not happening, but RLC level retransmissions could be happening, affecting the end-to-end throughput.

UE Traffic Suffers RLC-Retransmissions (Indicating Packet Loss in Wireless Networks):
- eNB periodically sends UE-specific radio-condition-related health counters to EPC, through a 'novel' proprietary interface specifically used for the private CBRS network.
- EPC monitors these counters and detects the high RLC retransmissions above a threshold for the specific UE bearers.
- EPC performs in steps a) pre-fragmentation to reduce the packet size, b) performs MSS-clamping to reduce packet sizes for the next TCP sessions c) sets lower MTU values for any new PDN connections from the UE.
- EPC continues monitoring the counters to detect whether the RLC-retransmissions have fallen below a lower threshold for the specific UE.
- EPC performs reverse steps a) stops pre-fragmentation to lower-packet size, b) avoids MSS-clamping for the next TCP sessions c) sets higher MTU values for any new PDN connections from the UE.

The same concept is applicable in CBRS NR networks and Wi-Fi networks-either in standalone modes or even when these technologies are utilized concurrently (such as LAA (Licensed Assisted Access)/ENDC (Evolved New Radio Dual Connectivity)/Carrier-aggregation) modes.

If TCP-SACK is not supported by UE, then EPC may have to resort to other methods of detecting TCP-retransmissions.

UE might perform its own packet-size adjustments based on its own assessment of the network capability and/or Radio conditions and this proposal is not precluding them.

UE application may perform its own IPMTUD (Independent Path MTU Discovery) and/or PLPMTUD (Packetization Level Path MTU Discovery) and it is independent of the methods/systems described herein.

For non-IPv4 and non-IPV6 bearers—other methods and systems may be used.

DETAILED DESCRIPTION

In some embodiments, using higher MTU (Maximum Transmission Unit) for enterprise CBRS (Citizen Band Radio Service) networks raises challenges. In some embodiments, packet-size selection is made dynamic for each of the UEs (User Equipments) traffic flows, using statistical counters and predictions based on packet losses and delay observations, in the CBRS system in the enterprise networks. Further to make the UE-specific radio-health information accessible proprietary communication interface between eNB (eNodeB) and EPC (Evolved Packet Core) is presented in some embodiments.

Figure 1:
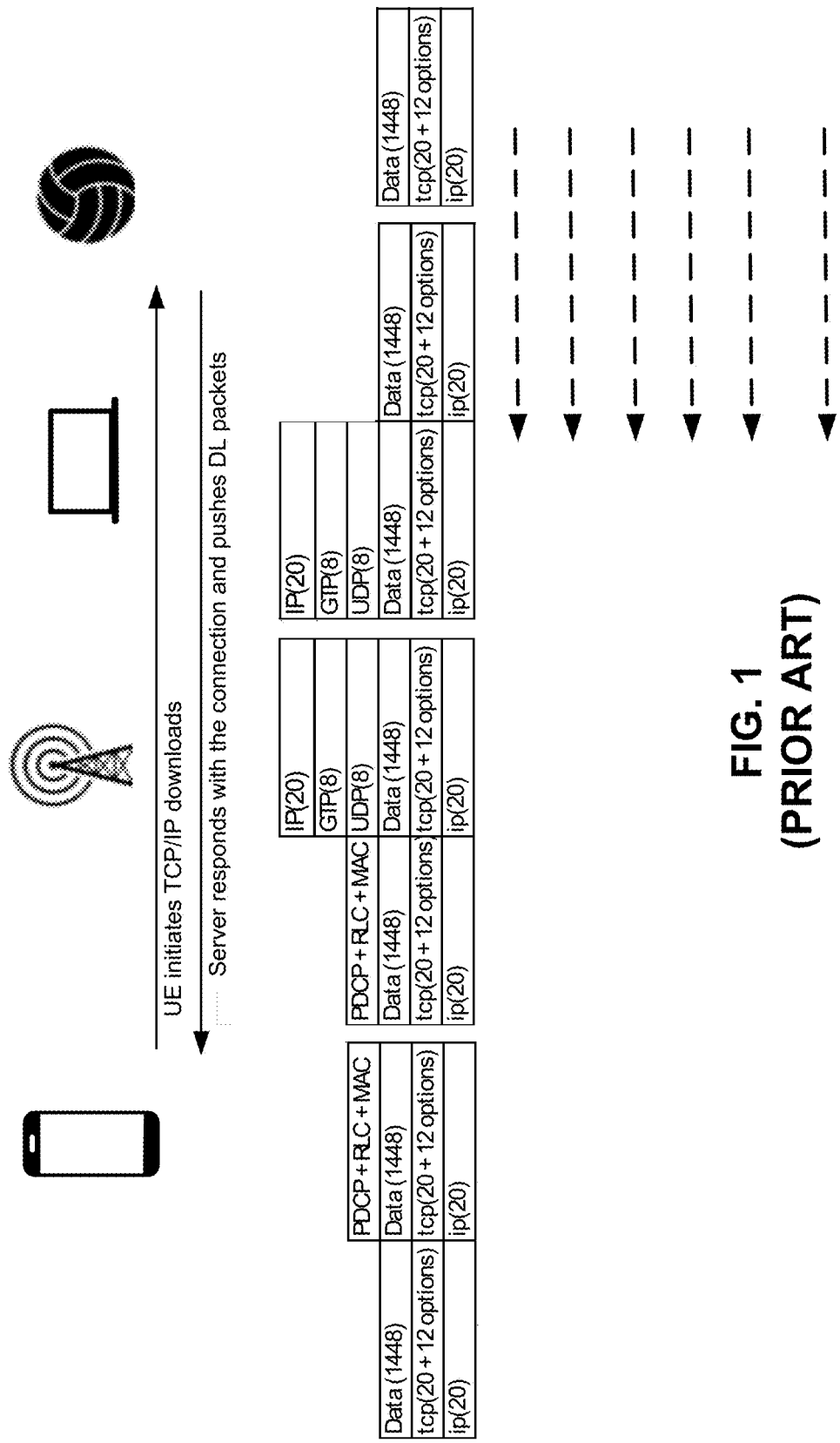
FIG. 1 illustrates a network in which the network uses 1500 byte MTU and the reduction in the payload of a packet due to GTP/IP overheads.
Figure 2:
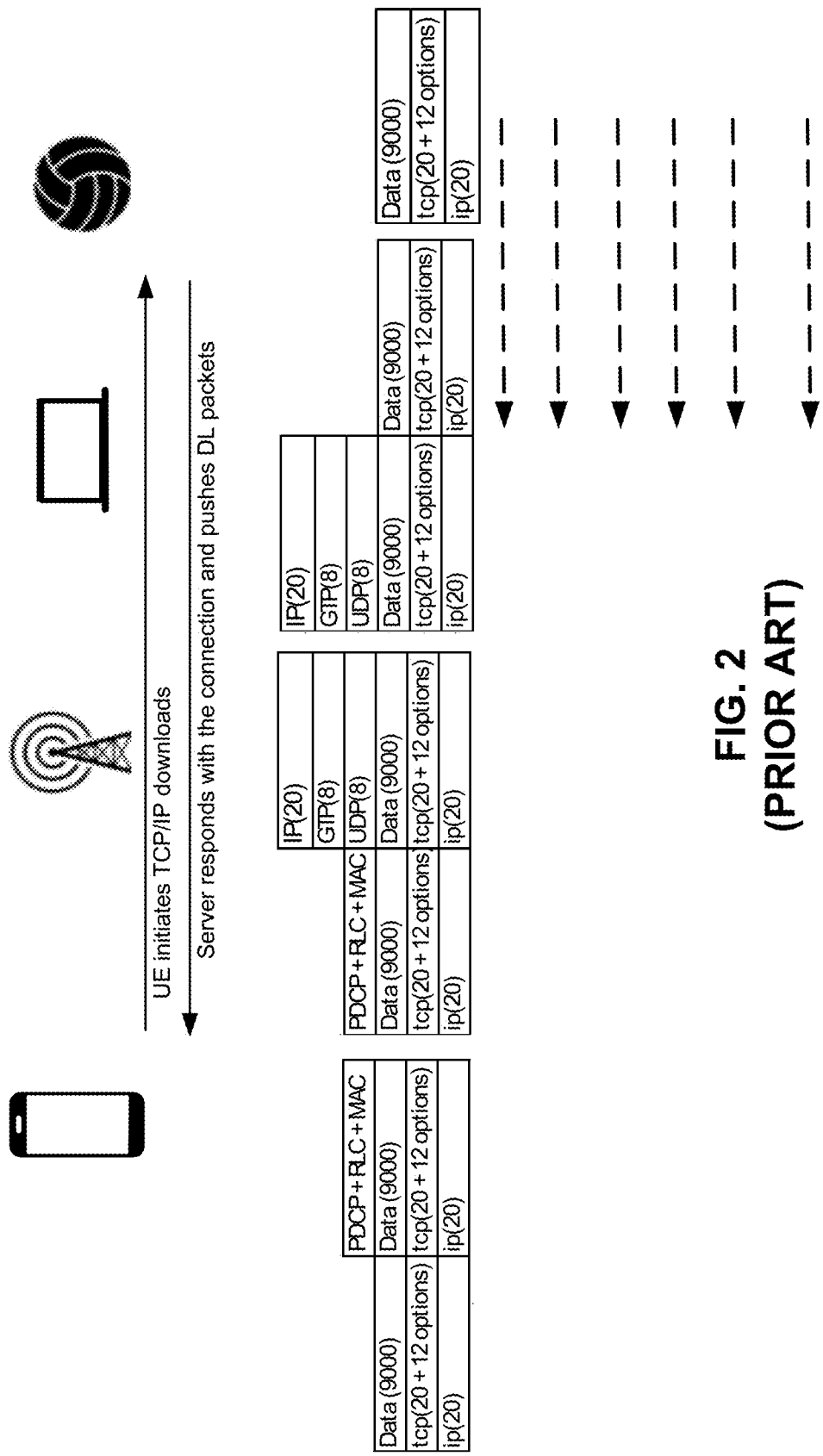
FIG. 2 illustrates a network in which the network uses 9192 byte MTU and the reduction in the payload of a packet due to GTP/IP overheads.
Figure 3:
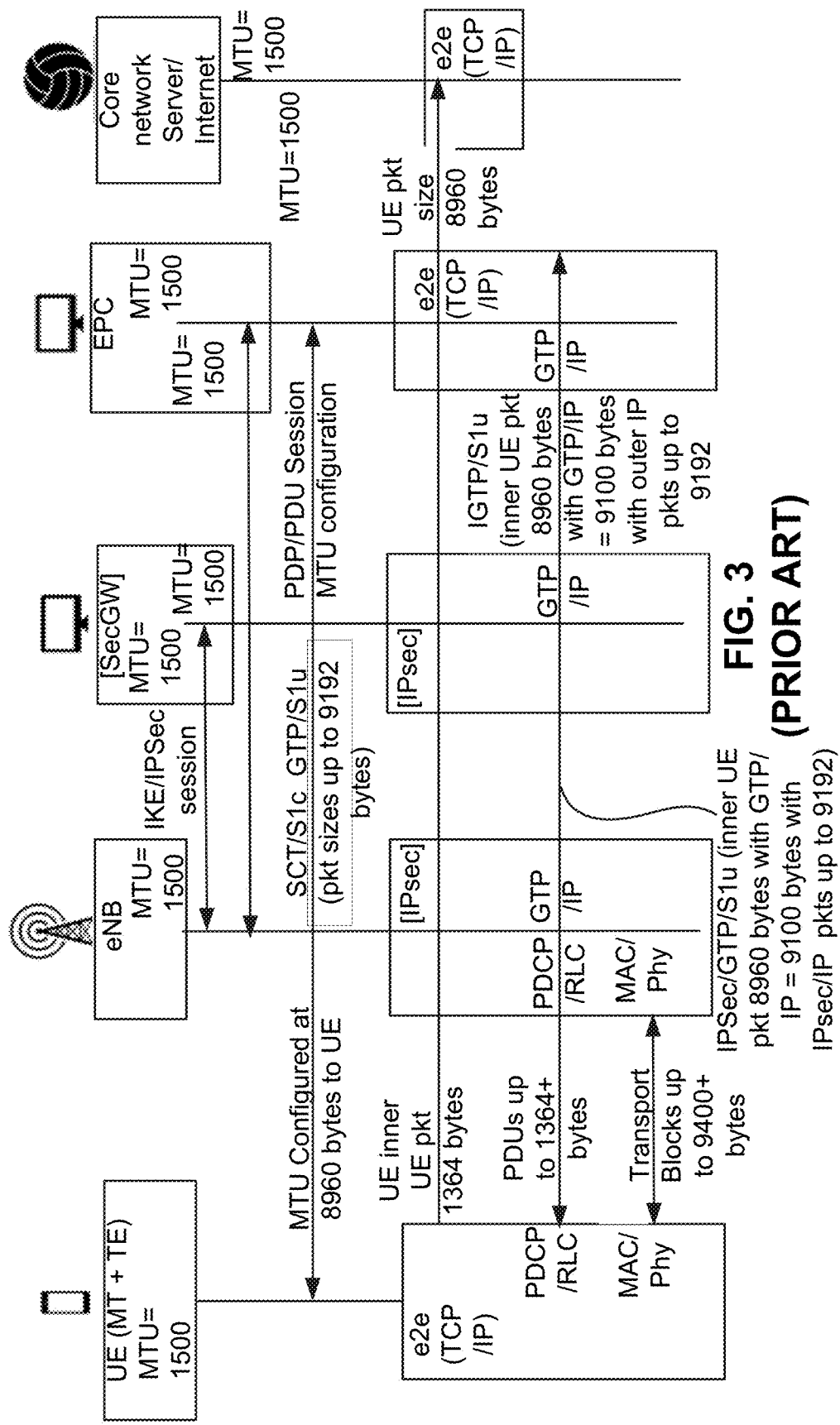
FIG. 3 illustrates a network having a static setting of 1500-byte MTU in both core and the RAN.

Concerning CBRS private LTE (Long Term Evolution) networks, when the enterprise owns and operates the cellular network as well enterprise network, the eNB and EPC elements are just separated by a VLAN/L3 (Virtual Local Access Network/Level 3) router. In some such embodiments, there's no IPSec (Internet Protocol Secure link) involved. It is possible that the MTU setting used in the network can be as high as 9192 bytes. If the core network uses 9192 bytes as MTU for example, then the network architecture is as depicted in FIG. 2. The server can send a single 9000-byte packet with a 52-byte header.

Current systems set a different MTU by a UE based on radio-condition monitoring on its side. But UE is a termination point of both wireless and IP connection, whereas some embodiments of the disclosed method and apparatus perform dynamic MTU setting and enforcement in an intermediate node like EPC.

Here the saving is about 312 bytes (6 packets of 52 bytes of information) for a 9000-byte payload, which translates to a savings of just 3% in overhead. These 312 bytes (UE header overhead for packet-headers information) are also saved from going through PDCP-ciphering and transmissions over the wireless layers of RLC/MAC.

While this packet-header overhead saving of 3% in itself might seem insignificant, making the packet size large has an indirect benefit of reducing the packet rate, and reducing the packet-rate by 84% (1 large packet instead of 7 small packets).

As can be seen the higher MTU in RAN and Core helps reduce the packet-header overheads and when UE's are provided with IPV6 addresses, this savings in overhead becomes double to 6%.

While using higher packet sizes on the DL for applications like TCP, the TCP acknowledgments that need to flow back are also reduced. In the above example, to transport a set of 36 k bytes, if 1400-odd byte packets are used, it will result in 14+ Uplink TCP-ACK packets (approximate 14×64~=900 bytes. However, when the same 36 k, when transported using 4×9 k TCP packets, it results in just 2 Uplink TCP-ACK packets (2×64~=125 bytes). Essentially the traffic savings on UL can be more than 6 times, up to 85%, and while using IPV6 for UE's, the effective savings on UL overhead is even higher.

As can be seen, with the higher MTU usage at the TCP level, the Uplink Demand (packets/byte) comes down and this is significant and helps better even if the DL/UL configuration is more DL-centric in the CBRS LTE-TDD (CBRS LTE-Time Division Duplexing) systems.

Similar benefits may be realizable on other transaction-oriented protocols like NetBios, QUIC (Quick UDP Internet Connections, UDP is an anacronym for User Datagram Protocol) and those examples are not discussed explicitly here.

In the typical operator/service-provider networks, these extra packet headers are also counted for the end-users byte-count/month, but in the private LTE networks, the transportation efficiency, increase in throughput, etc., which results in a better user experience, which is valued more than the byte size count and larger packet-sizes can help in this case.

As discussed, large packets may not reduce overhead significantly, but large packets reduce the packet rate (effectively to ⅙th, for a typical 9 k byte packet).

The packet rate savings is applicable for both eNB and EPC nodes while processing GTP and SCTP (Stream Control Transmission Protocol) traffic.

Similarly, in the intervening switches, where packet decisions are done purely based on headers and the actual data is switched in cut-through mode, large packet sizes and reduced packet rates are again beneficial.

Also, for the eNB, the reduction in packet rate translates to a reduction in the number of scheduling triggers like buffer occupancy updates, PDCP (Packet Data Control Protocol) ciphering/deciphering operations (and IPSec encryption/decryption operations, if applicable). In ciphering/crypt operations, typically DMA (Direct Memory Access) transfers are used, instead of a CPU (Central Processor Unit) initiating multiple small-packet transfers), and usually larger packet sizes are beneficial (for DMA transfers).

Currently, UEs provide a wide variety of information regarding the RAN capability (of the UE) and the amount of information is ever-increasing. This information is shared between EPC and eNB on signaling messages during UE attachments/UE handovers etc., and using the higher MTU allows for lower signaling packet rates and SCTP level fragmentation/reassembly overheads for eNB and EPC.

As the amount of traffic consumed over mobile devices increases, the associated security transactions also increase and almost every transaction requires TLS protection, which benefits from larger packet sizes a connection, download a page, etc.

Using larger packet sizes on the RAN requires the UE/mobile to be capable of supporting those packet sizes. If certain devices do not support the larger packet sizes, then the full system should be capable of supporting both small-MTU UE's as well as large MTU UE's.

Similarly, the portion of the core network between the APs and EPC should also support larger packet sizes. If the system falls back to the normal lower MTU values.

Also, if the core network is partially covered with higher MTU, then again it will place certain difficulties when the UE's which are attached via higher-MTU APs handover service of a UE or during UE move-arounds to APs that are covered by lower-MTU network or vice-versa. In such cases, the UE needs to be reconfigured with an appropriate MTU and in case of ongoing transactions, those packets will undergo IP-level fragmentation and re-assembly in eNB and EPC, which can negatively impact performance.

In case the UEs are operated in bad SINR (Signal-to-Interference-and-Noise Ratio) conditions, even though more retransmissions are happening at the HARQ (Hybrid Automatic Repeat Request) level, the service provided is still ok. However, if the RLC level retransmissions are happening more, it means the entire 9 k higher layer TCP packet has to be retransmitted rather than retransmitting only the failed packet (amongst the 6-7 of the smaller MTU TCP packets of sizes 1500 and 312 bytes). Consequently, the RLC level retransmission penalty is more with big packet sizes and the RLC level retransmission penalty becomes an issue when the UE moves between high SINR and low SINR conditions often.

In case packets are dropped in the core (or) if the RLC-retransmissions fail to recover the packet losses in RAN, the larger size packets require retransmissions of the entire packet (as compared with a selected number of retransmissions amongst the 6-7 smaller sized packets).

Packet Routing and Transfer Function

The packet routing and transfer function:
- routes and transfers packets between a mobile TE (Tunnel Endpoint) and a packet data network, i.e. between reference point R and reference points Gi or SGi;
- routes and transfers packets between mobile TE across different PLMNs (Public Land Mobile Networks), i.e.:
- between reference point R and reference point Gi via interface Gp;
- between reference point R and reference point SGi via interface S8;
- routes and transfers packets between TEs, i.e., between the R reference point in different MSs (Message Sizes); and
- optionally supports IP Multicast routing of packets via a relay function in the GGSN (Gateway GPRS Support Node) and P GW (Packet Gateway).

The PDP PDUs (Packet Data Protocol Packet Data/ Distribution Units) shall be routed and transferred between the MS and the GGSN or P GW as N PDUs. To avoid IP layer fragmentation between the MS and the GGSN (GPRS Support Nodes) or P-GW, the link MTU size in the MS should be set to the value provided by the network as a part of the IP configuration. The link MTU size for IPV4 is sent to the MS by including the MTU size in the PCO (Protocol Configuration Option (see TS 24.008 [13]). The link MTU size for IPV6 is sent to the MS by including the MTU size in the IPV6 Router Advertisement message (see IETF RFC 4861 IPv6 Neighbor Discovery, published by the United States Dept. of Transportation).

When using a packet data network connection of type "non-IP" (see clause 4.3.17.8 of TS 23.401 published by the 3rd Generation Partnership Project; entitled "Technical Specification Group Services and System Aspects; GPRS enhancements for E-UTRAN access"), the maximum uplink packet size that the MS uses may be provided by the network as a part of the session management configuration by encoding the MS within the PCO (see TS 24.008 published by the 3rd Generation Partnership Project; entitled "Technical Specification Group Core Network and Terminals; Mobile radio interface Layer 3 specification; Core network protocols; Stage 3"). To provide a consistent environment for application developers, the network uses a maximum packet size of at least 128 octets (this applies to both uplink and downlink).

In some embodiments, the network configuration ensures that for PDP type IPv4v6 and the link MTU values provided to the UE, via the PCO and in the IPV6 Router Advertisement message, are the same. In some embodiments, when this condition cannot be met, the MTU size selected by the UE is unspecified.

When the MT and the TE are separated, e.g., a dongle-based MS, it is not always possible to set the MTU value by information provided by the network. In some embodiments, the network has the capability of transferring N-PDUs containing PDP PDUs, where the PDP PDUs are of 1500 octets, between the MS and GGSN/P-GW.

In some embodiments, when the TE is separated from the MT, the TE can perform MTU configuration itself, which is out of the scope of 3GPP standardization procedures. Thus, even when the MT component in the terminal obtains MTU configuration from the network, the behavior of the MS, considered as a whole, may not always employ the MTU configuration of the network. In many terminals having a separated TE, the TE component is configured by default to use an MTU of 1500 octets.

In some embodiments in which the network deployments have an MTU size of 1500 octets in the transport network, providing a link MTU value of 1358 octets to the MS, as part of the IP configuration information from the network, prevents the IP layer fragmentation within the transport network between the MS and the GGSN/P-GW.

In some embodiments, as the link MTU value is provided (e.g., as a part of the session management configuration information), a link MTU value is provided during the establishment of each PDN connection.

In some embodiments, PDP type PPP is supported only when data is routed over a GGSN employing the Gn/Gp interfaces (the interface between GGSN and SGSN). In some such embodiments, A P-GW supports PDP type IPv4, IPv6 and IPv4/v6 only.

Between the 2G SGSN and the MS, PDP PDUs are transferred with SNDCP (Sub Network Dependent Convergence Protocol). Between the 3G SGSN and the MS, PDP PDUs are transferred with GTP U and PDCP.

Between the SGSN and the GGSN when using Gn/Gp, or between the SGSN and the S GW when using S4, PDP PDUs are routed and transferred with the UDP/IP protocols. The GPRS Tunnelling Protocol (GTP) transfers data through tunnels. A tunnel endpoint identifier (TEID) and an IP address identify a GTP tunnel. When a Direct Tunnel is established, PDP PDUs are routed and transferred directly between the UTRAN (UMTS Radio Access Network) and the GGSN using Gn or between UTRAN and the S GW using S12. On S5/S8 interfaces PMIP may be used instead of GTP (see 3GPP standard TS 23.402; entitled "Architecture enhancements for non-3GPP accesses").

Static Higher MTU Setting for the System:

In some embodiments, the following steps are performed in the system, in the eNB, the EPC, the intervening network elements, as well as in the UE. This section describes steps for setting up a static MTU configuration that uses higher MS values, such as 9000 bytes, throughout the entire system.

In some embodiments, the UE can support high MTU/MSS settings. The EPC/Core-network elements set up the MTU, accordingly, while setting up/modifying the packet-session.

The core network between eNB to EPC is configured to 9192 bytes and further to the enterprise servers are all configured with higher MTU settings, such as 9100 bytes (to cover for the GTP/IP (and optionally the IPSec/Vlan) encapsulation in the RAN network). If the IPV6 is used, an additional 32 bytes of overhead can be added as a buffer.

In the eNB and EPC nodes, the entire system buffer pools/memory pools shall be re-tuned to support a greater number of 9192-byte packets in various software/hardware components, crypto driver layers and networking driver layers.

If the eNB is configured to perform any kind of TCP-MSS clamping operations or packet-size reductions (in either direction), that functionality shall be disabled.

Optionally, both the eNB and EPC (Sgw/Pgw—Secure gateway/Packet gateway) shall be capable of fragmenting and reassembling (GTP-encapsulated) outer IP packets at wire speeds with very little impact on performance.

The EPC system should maintain statistics and counters on, the count of bearers using larger MTU sizes, the count of bearers using smaller MTU sizes, the count of packets transferred using larger MTU packets in both DL and UL directions for the UEs (and an aggregate counter) and count the packets transmitted-with fragmentation at IPv4/IPv6 levels in RAN.

Figure 4:
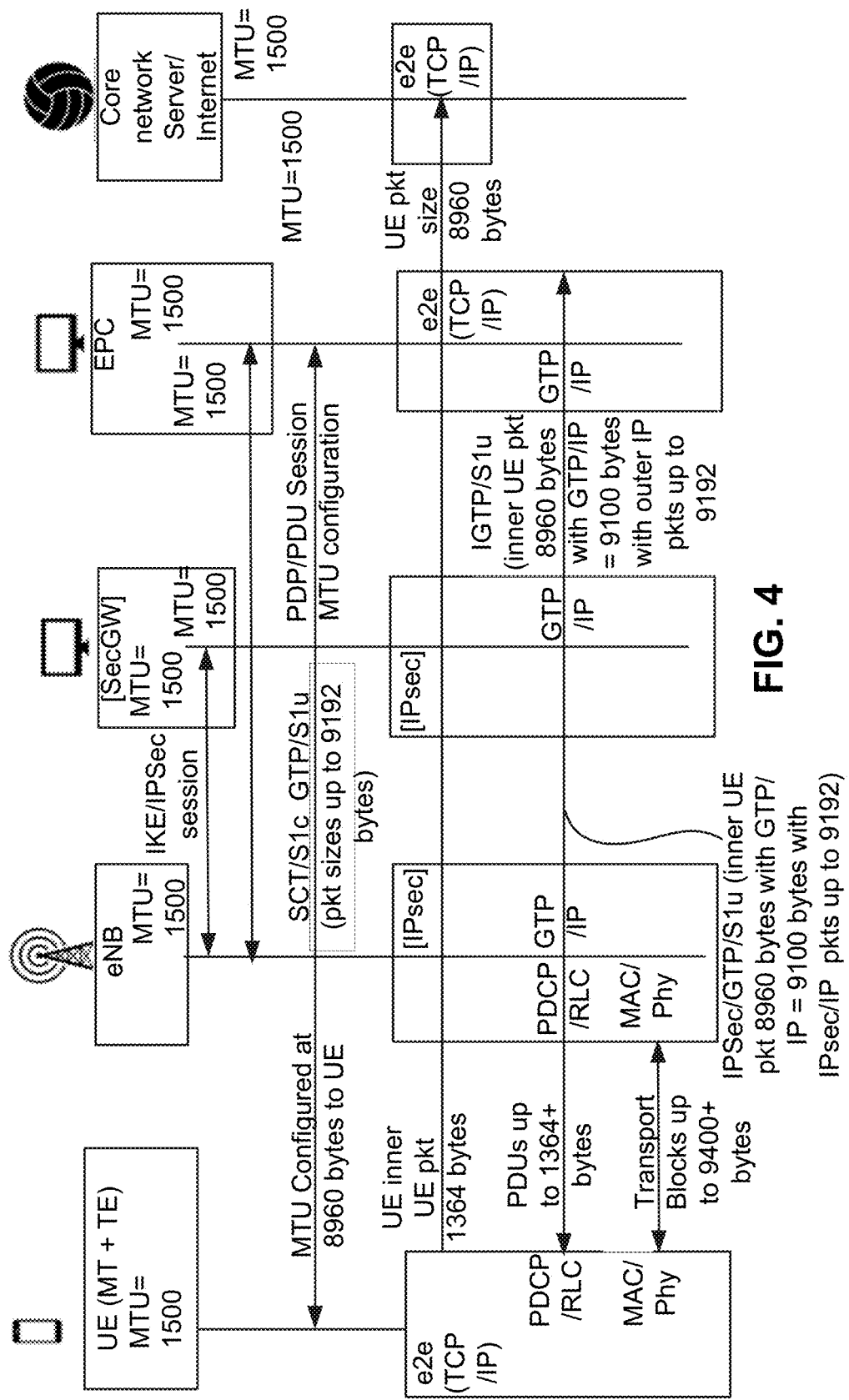
FIG. 4 illustrates a network with a static setting of 9000-byte MTU in both the core and the RAN and illustrates typical packet-size transactions used to avoid fragmentation/reassembly at the IPV4 level.

FIG. 4 explains the static setting with a higher level 9000-byte MTU in both core and RAN and typical packet-size transactions used to avoid fragmentation/reassembly at the IPV4 level. Note that the numerical values are example numbers and can be different depending on the encapsulations, UE-protocols, Core-network configuration used.

Dynamic MTU Management for Different UEs/Different Flows-Basic

Apart from using static MTU/MSS settings for the entire system as described above, it is still possible that the UE due to its internal reasons, may not be able to support the higher MTU capability, and in such situations, this section discusses an option to support different MTU values for different UEs/flows.

Figure 5:
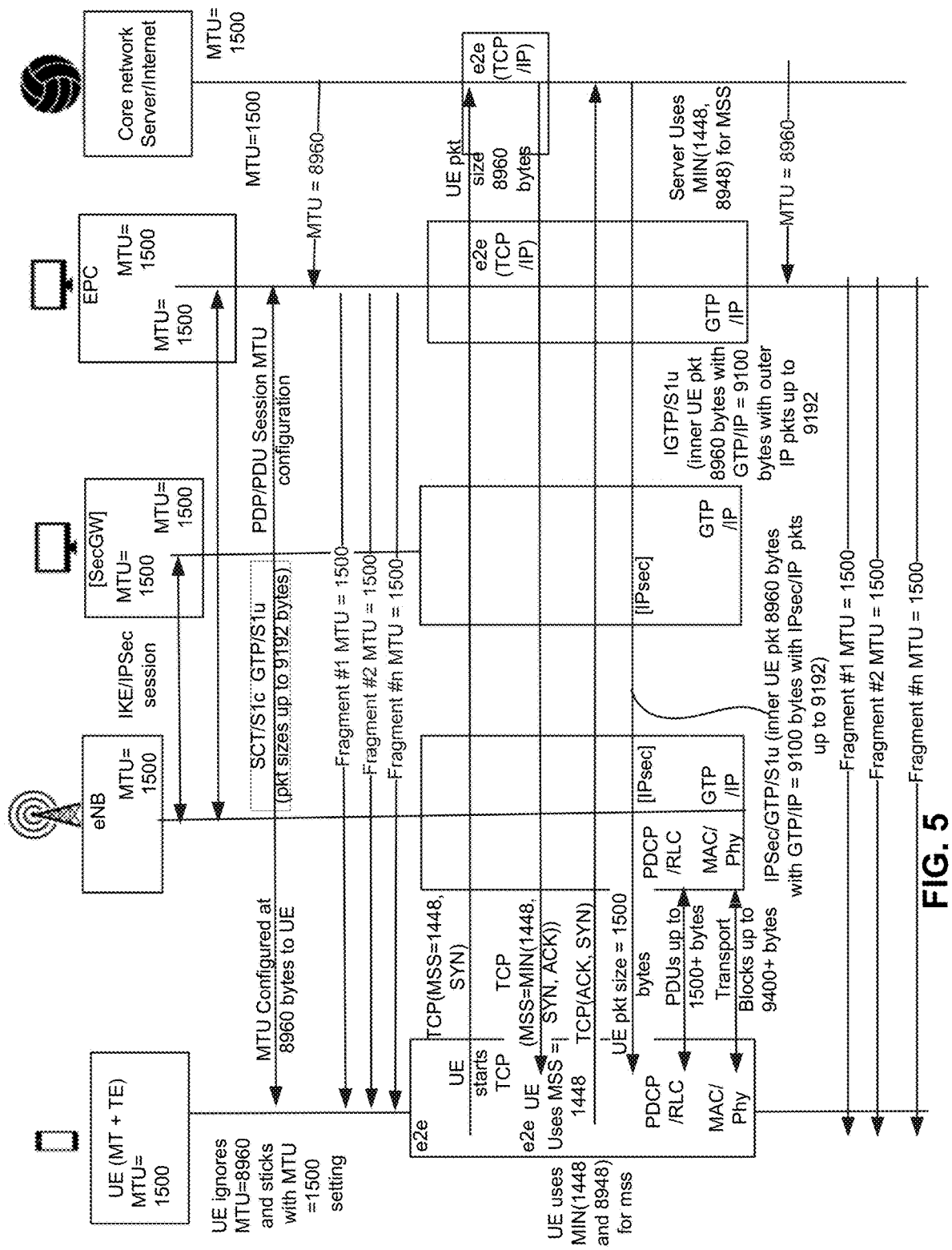
FIG. 5 illustrates a static setting with a higher level 9000-byte MTU in both the core and the RAN and illustrates typical packet-size transactions that are used to avoid fragmentation/reassembly at the IPV4 level.

FIG. 5 explains the static setting with a higher level 9000-byte MTU in both the core and the RAN and typical packet-size transactions used to avoid fragmentation/reassembly at the IPV4 level. FIG. 5 shows the same network and set of connections as FIG. 4 in which large packets sent from the core to the EPC are fragmented into 3 fragments.

Assuming the core network up to eNB is capable of higher level MTU, the system does not know whether the UE is really capable or not, it begins with the assumption that UE's MTU is still at 1500 bytes and every downlink packet is pushed through after doing IP-level fragmentation (pre-fragmentation before GTP/IP/IPSec encapsulations). For uplink traffic, UE may use up to 9000 bytes, and then the system supports it.

When the UE begins TCP negotiations and starts with a hint MSS value of <1500 bytes, that is intercepted by EPC and EPC marks that particular UE's MTU capability to be limited to 1500 bytes and continues with the IP fragmentation strategy.

For other UE's that indicate higher MSS value (such as, 8960 bytes), EPC allows full 9000-byte higher MTU traffic, without resorting to fragmentation, as described in the previous section. Note that the numerical values are example numbers and can be different depending on the encapsulations, UE-protocols and core-network configuration used.

Dynamic MTU Management for Different UEs/Different Flows-Strategic

As mentioned earlier, it is also possible that it might be inefficient to use higher MTU on select occasions. So, to provide relief and a fallback for those UEs the system should provide different MTU/MSS settings for UEs and different flows of specific UEs. These steps help achieve such dynamic decision-making in MTU/MSS settings.

Figure 6:
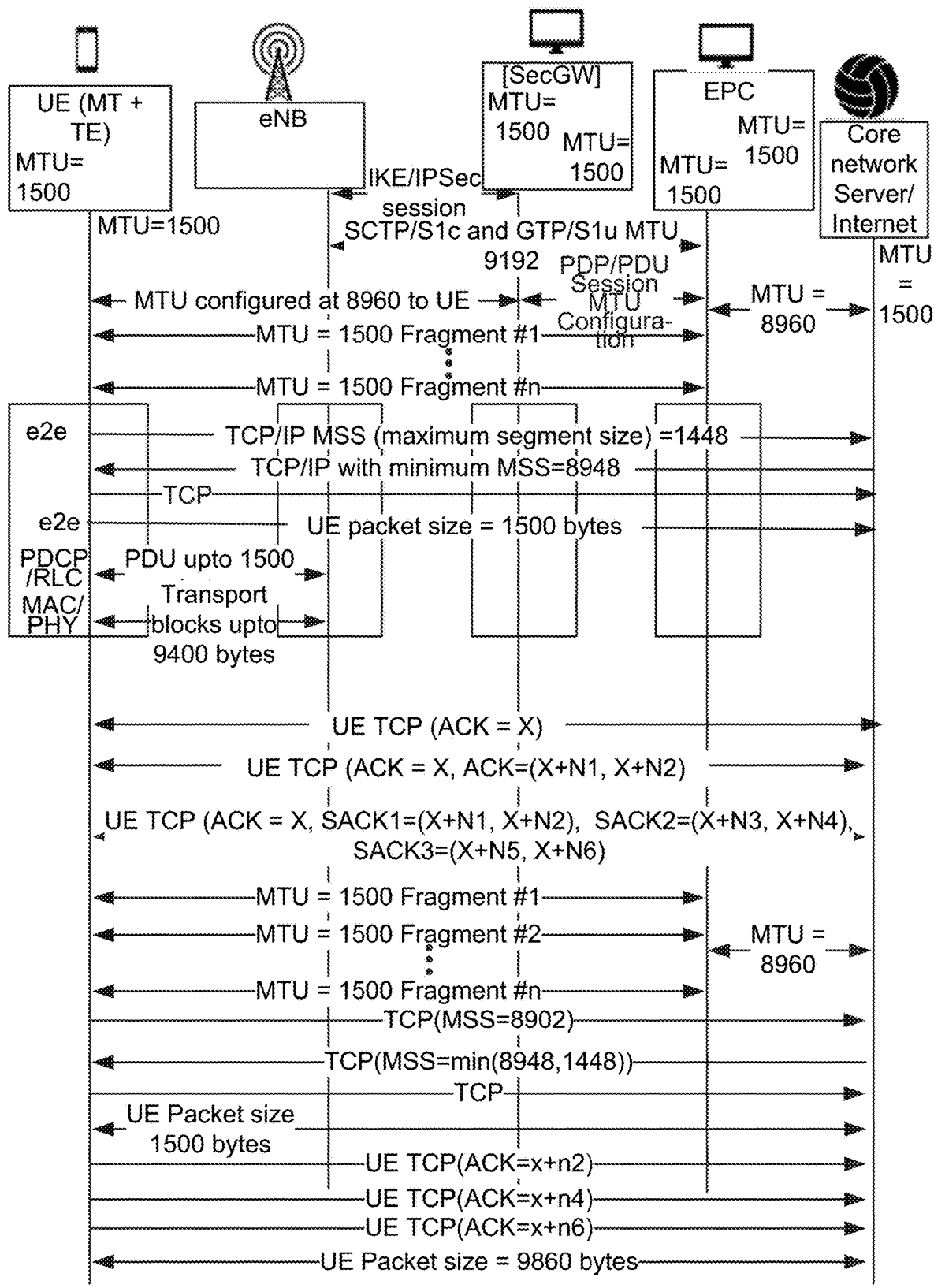
FIG. 6 illustrates static settings in a network having a higher level 9000-byte MTU in both the core, the RAN and how the MTU/MSS settings are dynamically adjusted to different UE/flows.

FIG. 6 explains the static setting with higher level 9000-byte MTU in both core and RAN and how MTU/MSS settings may be dynamically adjusted to different UE/flows. Note that the numerical values are example numbers and can be different depending on encapsulations, UE-protocols and core-network configuration used.

Even though the system and the UE are set up with a setting that is higher than 9000 bytes, EPC assumes the UE has a capability of only a 1500-byte MTU in the DL direction and performs IP-fragmentation if higher packet-size traffic is received from the core.

If the UE initiates the TCP connection with the Servers, the TCP-MSS negotiates to higher values, such as 8900 or more bytes. Consequently, the UE is capable of accepting higher—MTUs—and the EPC marks this UE as such (and suspends IP-fragmentation in the downlink direction) for all traffic towards the UE.

UE and servers keep transacting TCP traffic, using higher MSS values (up to 8900 bytes). The EPC keeps intercepting and monitoring the traffic for retransmissions by monitoring the TCP-SACK gaps from the UE.

The mechanism of detecting the TCP retransmissions, via SACK monitoring, is described in Appendix A.

If those TCP transactions indicate packet loss between the Server and UE, then the EPC marks this UE capability temporarily as 1500 bytes and begins IP-pre-fragmentation of DL packets. The idea here is, if there are failures, retransmitting the entire 9000-byte packets results in unnecessary wastage of air link resources. If the IP packets are pre-fragmented and sent as 1500-byte packets or smaller, even if there are failures in air link, the RLC-level recovery needs to deal with smaller size packets.

At the UE-TCP level this still is an 8900-byte DL packet and results in fewer ACK packets in the uplink.

As the EPC has marked this UE's MTU capability as 1500-bytes, when the UE tries to set up new TCP/IP sessions and the UE and server try to negotiate TCP/IP MSS settings, the EPC intercepts them and does MSS-re-clamp to a lower value, such as 1500 bytes.

The EPC continues this UE-traffic IP-pre fragmentation and TCP-MSS re-clamping to lower MSS value, as long as the TCP-packet loss is noticed on other TCP-flow(s) for the UE.

In addition to this, if the UE establishes new PDN connections, the EPC can set smaller MTU values for those PDN connections to force the UE to use smaller-sized payloads.

The EPC continues monitoring the UE's TCP-acks and as soon as the SACK-gaps reduce for a certain monitoring period, the EPC restores the higher MTU values and restores the UE to step-B) as above and avoids pre-fragmentation and lower-MSS-clamping for the UE-flows.

In addition to this, if the UE establishes new PDN connections, the EPC can set a higher MTU value for those PDN connections, to force the UE to use higher byte-count payloads.

Apart from these, the UE can perform its own monitoring of link performance and traffic rates and can choose its mechanism for determining the MTU and packet-sizes, and TCP-MSS values independently.

The system should maintain counters on the number of UEs utilizing higher MTU verses the number of UEs utilizing lower MTU. In addition to the above system-level statistics/counters, for the number of UEs whose MTU settings are changed from higher to lower value or vice-versa will be useful, to finetune the algorithm.

Dynamic MTU Management for Different UEs/Different Flows—Advanced

Note if the TCP-SACK is not supported or not reliable, the EPC may use other strategies to determine the network behavior for deciding MTU/MSS values for the UE-flows. For other transport protocols, other elaborate methods of detecting protocol retransmissions between the UE and server may be performed and are not described in this disclosure.

Sometimes even without higher layer retransmissions, if the eNB detects lots of RLC-retransmissions, it again may reduce throughput, especially with large MTU size packets, and even in those cases also, the MTU/MSS setting of UE shall be reverted to make it an effective payload<1500 bytes (One mechanism of detecting RLC retransmissions via RTT monitoring is described in Appendix-B).

Depending on the TCP flow monitoring and other approaches mentioned below, the EPC may choose to set up the link value during different UE's bearer setup/modify or PDN set-up/modify operations, to higher or lower MTU values, to balance higher efficiency with higher MTU and wastages due to packet-losses.

Additional periodic MTU discovery via IPMTUD and PLMTUD, an SCTP method may be performed by the UEs and servers periodically for different flows and, accordingly, decide on the MSS values. Depending on the end-to-end network (including the EPC/eNB/intervening nodes) supported, the UEs and servers may decide the MSS values, accordingly, independently of the proposal mentioned here.

Appendix A: TCP-Retransmission Detection Via SACK Information Monitoring

Figure 7:
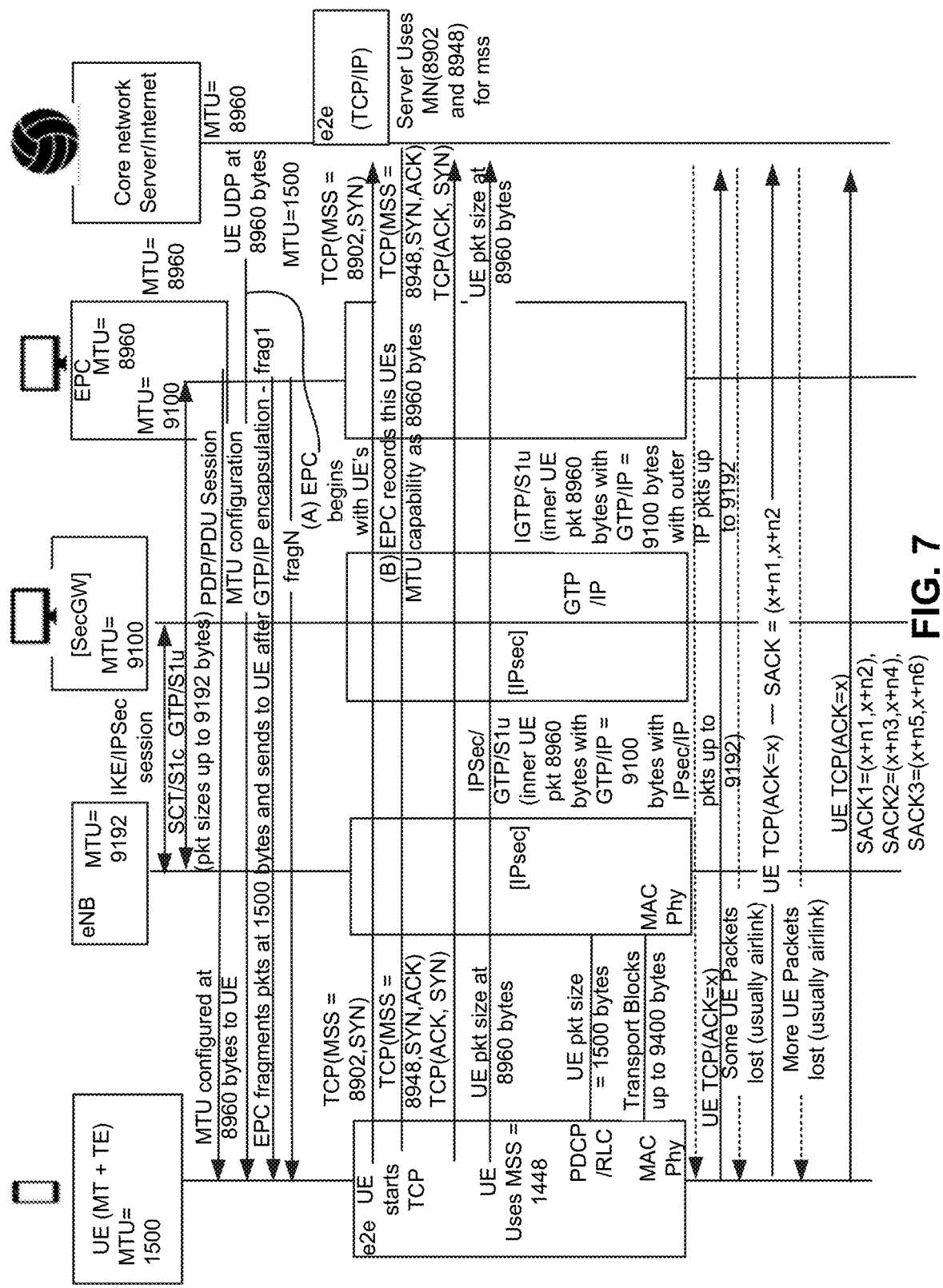
FIG. 7 illustrates modern TCP transactions, in which the TCP-SACK indicates how to efficiently handle the re-transmissions.

In modern TCP transactions, TCP-SACK has been introduced to efficiently handle the re-transmissions. It is roughly described and illustrated in FIG. 7, as follows:

The server pushes packets containing TCP-seq numbers x and further x+n1, all the way up to x+n6. However, the UE indicates to the server via TCP-SACK packets, that it has received up to sequence number x, and it has received some segments between x+n1 and x+n2 but is missing segments between x and x+n1, for example.

Similarly, UE could also be sending sacks indicating gaps in the reception and requesting the Server to retransmit.

The EPC is configured to perform deep packet inspections of the UE TCP packets between UE and the server for every UE's TCP connection/flow.

On reception of every Ack-packet containing SACK info, it calculates the re-transmission percentage as $$retx\ \% = \frac{retransmissionBytes}{totalBytes} = \frac{(x+n1-(x)) + [x+n3-x+n2] + [x+n5-x+n4]}{(x+n6)}$$

Where x=x−prevAck and prevAck=1$^{st}$ Ack sequence number (OR) Ack-sequence-number seen at the start of a time window.

EPC maintains information like

Now consider the situation where there's a proprietary channel of communication (S1 AP protocol extensions) available between the eNB and the EPC for periodically communicating about a per UE-specific Radio-health condition. For each UE, the eNB gathers UE-Radio-health information, such as:

DL: Tx bytes, PDCP-tx-bytes, Tx-Tonnage, RLC-failures, RLC-retransmissions, RLC-total transmissions, HARQ-retransmission counts, HARQ-failures, Avg DL CQI (Communication Quality Improvement), Avg Rank used, Avg Pathloss, etc.

UL: Rx bytes, PDCP-rx-bytes, rx-Tonnage, RLC-failures, RLC-retransmissions, RLC-total transmissions, HARQ-retransmission counts, HARQ-failures, etc.

Rrc-connection time (Radio-resource-control-connection time), Number-of-rrc-re-establishments, etc.

The EPC is configured to receive the UE-Radio-health-information messages and perform calculations, such as UE-RLC-fail in the last 1 sec, in the last 5-sec and in the last 10-sec in DL and UL directions.

Now, the EPC is equipped to make decisions such as, downgrading the UE's to lower MTU/MSS setting and performance pre-fragmentation and/or MSS-clamping-to-

| UE-IP | UE-port | Server-IP | Srvr-port | Time | prevAck-Seq-num | Total-received-bytes | Total retransmissions | Re-transmission percentage |
|---|---|---|---|---|---|---|---|---|
| U1 | Up1 | S1 | Sp1 | T1 + 1 sec | prevAck1 | | | A11 |
| U1 | Up1 | S1 | Sp1 | T1 + 2 sec | prevAck2 | | | |
| U1 | Up1 | S1 | Sp1 | T1 + 3 sec | prevAck3 | | | |
| U1 | Up2 | S1 | Sp2 | T1 + 1 sec | | | | A12 |
| U1 | Up2 | S1 | Sp2 | T1 + 2 sec | | | | |
| U1 | Up2 | S1 | Sp2 | T1 + 3 sec | | | | |
| U1 | Upn | Sn | Spn | T1 + 1 sec | | | | A13 |
| U1 | Upm | Sn | Spn | T1 + 2 sec | | | | |
| U1 | Upm | Sn | Spn | T1 + 3 sec | | | | |

Every measurement interval, the retransmission percentages of all of a specific UE's TCP connections are aggregated, and the average ratio is determined ((A11+A12+A13)/3). If this ratio is high (say 5%) over multiple measurement intervals (for example, 3 measurements of 1 sec each), it means either the network or the UE is having a noisy connection with many packet drops and if at that time, UE/network is using a higher-MTU/MSS setting for that UE, the EPC considers downgrading this UE for a lower MTU/MSS setting for future TCP-flows and begin pre-fragmenting the packets to lower MTU/MSS values.

If the retransmission percentages improve beyond specific threshold levels, then the EPC can restore the UE to higher MTU/MSS values supported in the network configuration.

Appendix B: RLC-Retransmission Detection Via RTT/Dup-Ack Information Monitoring

As described earlier RLC-retransmissions are detected more easily at the eNB level, but in this document, the CBRS UE's MTU/MSS setting is controlled at the EPC level. Consequently, one approach is to communicate this information from the eNB and the EPC using a non-standard proprietary message. However, the alternate approach is to be able to detect this condition at the EPC itself by monitoring the RTT values on each of the UE's Protocol flows and adjusting the MTU/MSS setting for the UE flows accordingly.

lower-MTU strategies if the number of RLC failures in last-1-sec increases beyond a certain threshold.

Similarly, if the number of RLC failures in the last 1 sec decreases beyond a certain threshold for the next X time windows (for example, the next 3 sec), the EPC can consider restoring the UEs to higher MTU/MSS setting and avoid pre-fragmentation and/or MSS-clamping-to-lower-MTU values.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining, based on various network operational factors, an optimal Maximum Transmission Unit (MTU); and establishing the determined MTU,
   by at least
   a) configuring a higher MTU between a core network and a node B and in a wireless RAN segment and dynamically adjusting packet sizes according to capabilities of a User Equipment (UE) and Radio-conditions;
   b) configuring the higher MTU in a private Citizen Broadband Radio Service (CBRS) network, wherein elements that are co-located and from the same vendor and enterprise network are easier to reconfigure for the higher MTU than elements that are not co-located;
   c) initially,
      1. configuring the private CBRS network with the higher MTU;
      2. configuring, by an Evolved Packet Core (EPC), the UE with the higher MTU during a Public Data Network-session (PDN-session) creation; and
      3. tuning the configurations of the EPC and the node B to process large-sized packets;
   d) based on whether there are Download-packets (DL-packets) downloaded to the UE,
      the EPC fragmenting the DL-packets to low-MTU and sending traffic toward the UE;
   e) processing Upload-packets (UL-packets) from the UE as-is;
   f) if the UE is capable of using the higher-MTU and the UE negotiating a Transmission Control Protocol (TCP) connection with a high-Maximum Segment Size (high-MSS) value, then the EPC sends whole packets, as-is, towards the UE; and
   g) if UE-traffic suffers TCP retransmissions,
      the EPC detecting the retransmission, by inspecting TCP-flow's Selective Acknowledgments (SACK) packets of the UE, and the EPC determining whether the TCP retransmissions are above a threshold, based on the detecting of the retransmissions.

2. The method of claim 1, further comprising the EPC continuing to monitor TCP-SACKs from UE TCP-flows and determining whether the TCP-retransmissions are below a threshold;
   if the TCP retransmissions are below the threshold, the EPC
   a) stops the fragmenting to a lower-packet size,
   b) avoids MSS-clamping for the subsequent TCP sessions, and
   c) sets the higher MTU for any new PDN connections from the UE.

3. The method of claim 1, further comprising if there are no TCP level retransmissions,
   but there are Radio Link Control (RLC) level retransmissions, affecting an end-to-end throughput, indicating packet loss in wireless networks,
   the node B periodically sending UE-specific radio-condition-related health counters to the EPC, through an interface specifically used for the private CBRS network.

4. The method of claim 3, further comprising the EPC
   a) monitoring the UE-specific radio-condition-related to health counters and
   b) detecting a high RLC retransmissions above a threshold for specific UE bearers.

5. The method of claim 4, further comprising the EPC
   a) fragmenting packets to reduce the packet size,
   b) performing MSS-clamping to reduce packet sizes for the subsequent TCP sessions, and
   c) setting lower MTU values for any new PDN connections from the UE.

6. The method of claim 4, further comprising the EPC
   a) continuing to monitor the counters to detect whether RLC-retransmissions have fallen below a lower threshold for the UE,
   b) stopping the fragmenting to a lower-packet size,
   c) avoiding MSS-clamping for the subsequent TCP session, and
   d) setting the higher MTU for any new PDN connections from the UE.

7. The method of claim 4, further comprising the EPC
   a) establishing an Internet Key Exchange/Internet Protocol (IKE/IP) security between node B and Secure Gateway (SGW);
   b) establishing—a—Stream Control Transmission Protocol/S1c-Generative Pretraining Transformer/S1u (SCTP/S1c-GPT/S1u) connection between the EPC and the node B with packet sizes up to a fixed maximum;
   c) establishing a Packet Data Protocol/Protocol Data Unit (PDP/PDU) MTU session configuration between the EPC and the node B with large packet size;

d) establishing a PDP/PDU Session MTU between the UE and the EPC;
e) establishing a UE inner UE packet end-to-end (e2e) TCP/IP UE uses TCP MSS to be large; and
f) transporting blocks between a Medium Access Control Physical layer (MAC Phy) of the UE and a MAC Phy of the node B.

8. The method of claim 7, further comprising the EPC
a) receiving large packets from the core network at the EPC, and
b) fragmenting the large packets into fragments prior to sending the packet to the UE.

9. The method claim 8, further comprising
a) measuring a percentage of messages retransmitted; and
b) determining whether to decrease a size of the messages based on the percentage of messages retransmitted.

10. The method claim 8, further comprising if the retransmissions are above the threshold, the EPC
a) fragmenting the packets to a smaller size;
b) implementing Maximum-Segment-Size-clamping (MSS-clamping) to reduce packet sizes for subsequent TCP sessions; and
c) setting a lower MTU value for any new PDN connections from the UE.

11. A system comprising:
an Evolved Packet Core (EPC), the EPC storing one or more machine instructions, which when invoked cause the EPC to implement a method including at least determining, based on various network operational factors, an optimal Maximum Transmission Unit (MTU), and establishing the determined MTU, by at least:
a) configuring a higher MTU between a core network and a node B and in a wireless RAN segment and dynamically adjusting packet sizes according to capabilities of a User Equipment (UE) and Radio-conditions;
b) configuring the higher MTU in a private Citizen Broadband Radio Service (CBRS) network, wherein elements that are co-located and from the same vendor and enterprise network are easier to reconfigure for the higher MTU than elements that are not co-located;
c) initially,
 1) configuring the private CBRS network with the higher MTU;
 2) configuring, by an EPC, the UE with the higher MTU during a Public Data Network-session (PDN-session) creation; and
 3) tuning the configurations of the EPC and the node B to process large-sized packets;
d) based on whether there are Download-packets (DL-packets) downloaded to the UE,
the EPC
 1) fragmenting the DL-packets to low-MTU and sending traffic toward the UE;
 2) processing Upload-packets (UL-packets) from the UE, as-is;
 3) if the UE is capable of using the higher-MTU and the UE negotiating a Transmission Control Protocol (TCP) connection with a high-Maximum Segment Size (high-MSS), then the EPC sends whole packets, as-is, towards the UE;
e) if UE-traffic suffers TCP retransmissions, the EPC detecting the retransmission, by inspecting TCP-flow's Selective Acknowledgments (SACK) packets of the UE, and the EPC determining whether the TCP retransmissions are above a threshold, based on the detecting of the retransmissions.

12. The system of claim 11, the method further comprising:
the EPC
a) continuing to monitor TCP-SACKs from TCP-flows of the UE and determining whether the TCP-retransmissions are below a threshold; and
b) if the TCP retransmissions are below the threshold,
 1) the EPC stops the fragmenting to a lower-packet size,
 2) avoids MSS-clamping for the subsequent TCP session, and
 3) sets the higher MTU for any new PDN connections from the UE.

13. The system of claim 11, the method further comprising:
if there are no TCP level retransmissions,
but there are Radio Link Control (RLC) level retransmissions, affecting an end-to-end throughput, indicating packet loss in wireless networks,
the node B periodically sending UE-specific radio-condition-related health counters to the EPC, through an interface specifically used for the private CBRS network.

14. The system of claim 13, the method further comprising:
the EPC
a) monitoring the UE-specific radio-condition-related to health counters and
b) detecting a high RLC retransmissions above a threshold for specific UE bearers.

15. The system of claim 14, the method further comprising:
the EPC
a) fragmenting packets to reduce the packet size,
b) performing MSS-clamping to reduce packet sizes for the subsequent TCP sessions and
c) setting lower MTU values for any new PDN connections from the UE.

16. The system of claim 14, the method further comprising:
the EPC
a) continuing to monitor the counters to detect whether RLC-retransmissions have fallen below a lower threshold for the UE,
b) stopping the fragmenting to a lower-packet size,
c) avoiding MSS-clamping for the subsequent TCP sessions, and
d) setting the higher MTU for any new PDN connections from the UE.

17. The system of claim 14, the method further comprising:
the EPC
a) establishing an Internet Key Exchange/Internet Protocol (IKE/IP) security between node B and SGW;
b) establishing an SCTP/S1c-GPT/S1u connection between the EPC and the node B with packet sizes up to a fixed maximum;
c) establishing a Packet Data Protocol/Protocol Data Unit (PDP/PDU) MTU session configuration between the EPC and the node B with a large packet size;
d) establishing a PDP/PDU Session MTU between the UE and the EPC;
e) establishing a UE inner UE packet end-to-end (e2e) TCP/IP UE uses TCP MSS to be large; and f) transporting blocks between a Medium Access Control Physical layer (MAC Phy) of the UE and a MAC Phy of the node B.

18. The system of claim 17, the method further comprising:
the EPC
   a) sending large packets from the core network to the EPC, and
   b) fragmenting the large packets into fragments prior to sending the packet to the UE.

19. The system—of—claim 18, the method further comprising:
   a) measuring a percentage of messages retransmitted; and
   b) determining whether to decrease a size of the messages based on the percentage of messages retransmitted.

20. The system of claim 11, the method further comprising:
if the retransmissions are above the threshold,
   a) the EPC fragmenting the packets to a smaller size;
   b) implementing Maximum-Segment-Size-clamping (MSS-clamping) to reduce packet sizes for subsequent TCP sessions; and
   c) setting a lower MTU value for any new PDN connections from the UE.

\* \* \* \* \*